April 10, 1934. G. E. WESTBERG ET AL 1,954,005
PLASTERING MACHINE
Filed April 27, 1931
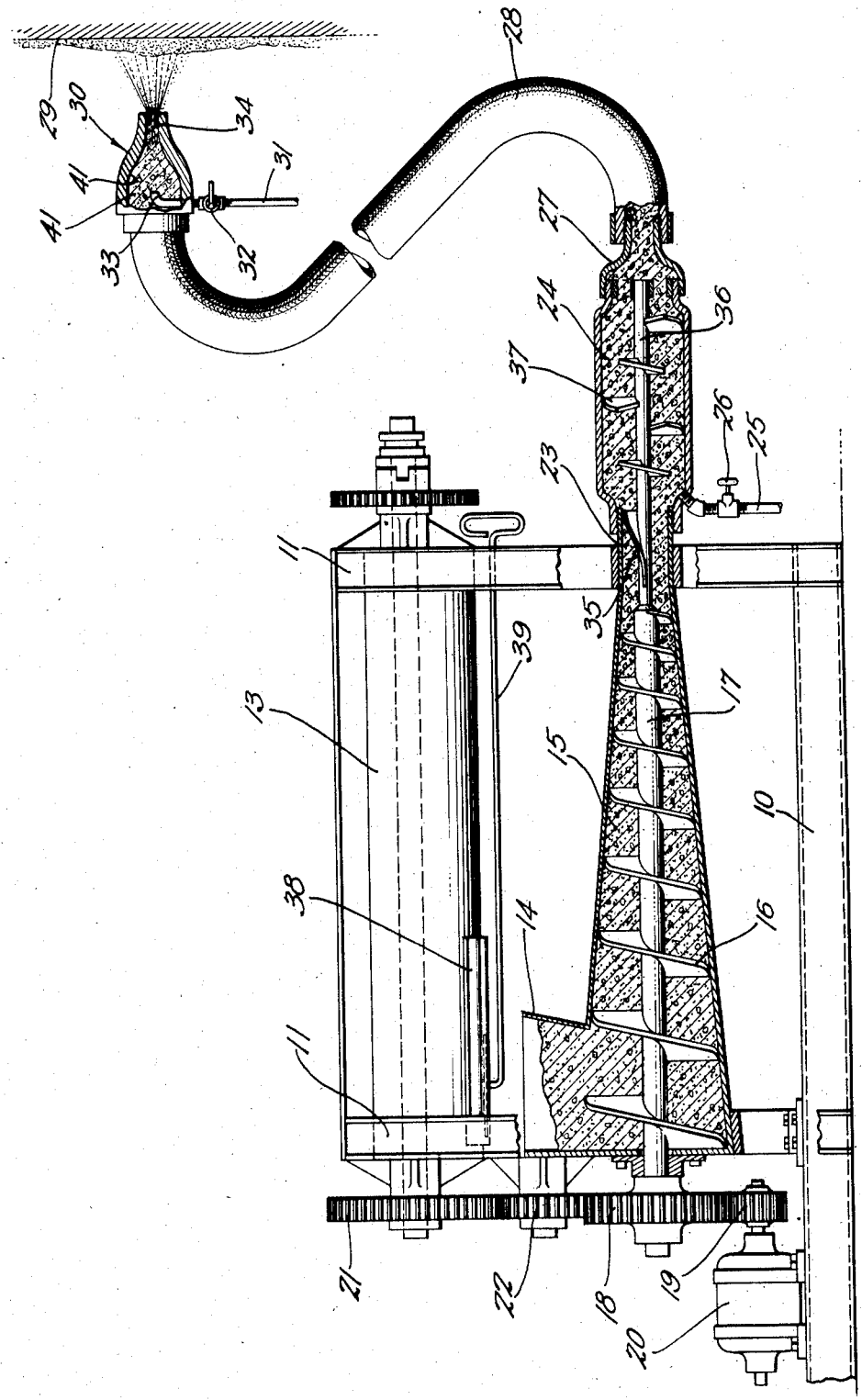
INVENTORS
Gustave Edward Westberg.
Lawrence E. McCormack.
BY Townsend. Loftus + Abbett
ATTORNEY Patented Apr. 10, 1934

1,954,005

UNITED STATES PATENT OFFICE 1,954,005

PLASTERING MACHINE

Gustave Edward Westberg and Lawrence E. McCormack, Los Angeles, Calif.

Application April 27, 1931, Serial No. 533,260

2 Claims. (Cl. 91—45)

This invention relates to a method and means for handling plastic material, and particularly pertains to a plaster machine.

It is the principal object of the present invention to provide a machine for conveying plastic material from a source of supply or mixer and causing it to be forcefully and uniformly applied in a coating of any desired thickness upon a surface, such for instance as a side wall or ceiling. The present invention contemplates the provision of means for imparting mechanical force to a mass of plastic material and for forcing it through a conduit to a point of eduction and providing pneumatic means at the point of eduction for breaking up the mass of delivered plastic material and spreading it on to a surface to be plastered, the structure also contemplating the introduction of a thinning and lubricating liquid at a point in the line of transit and in advance of the power imparting means.

The invention is illustrated by way of example in the accompanying figure which shows a form of the invention with parts broken away for the sake of clearness.

Referring more particularly to the drawing, 10 indicates a base upon which uprights 11 are disposed. Carried at the top of the uprights is a mixing structure 13 within which various ingredients may be placed and mixed. At one end of the mixing structure is a hopper 14 which communicates with a pressure chamber 15 which extends horizontally and receives a feed conveying screw 16. The pressure chamber gradually reduces in diameter toward its outer end and the feed screw 16 progressively reduces in pitch and diameter toward the outer end of the pressure chamber. The external diameter of the feed screw substantially agrees with the internal diameter of the pressure chamber. The screw 16 is mounted upon a shaft 17 which carries a gear 18 at its outer end. The gear 18 is in mesh with a pinion 19 mounted upon a motor 20. Gears 21 of the mixing structure 13 are driven from the motor and the gear 18 through intermediate gears 22. The outer end of the pressure chamber 15 terminates in a cylindrical sealing passageway 23 which agrees in diameter with the reduced diameter of the pressure chamber. An auxiliary mixing chamber 24 is in communication with the end of the sealing chamber 23. This mixing chamber is of larger diameter than the sealing chamber so that the material forced thereinto from the pressure chamber will have an opportunity to expand and mix with water or other liquid introduced through the pipe 25 as controlled by valve 26.

The outer end of the auxiliary mixing chamber 24 is fitted with a reducing cap 27 having an outlet of a diameter substantially the same as the inlet to the auxiliary mixing chamber, or less. This reducing fitting 27 communicates with a flexible conduit 28 through which the material may be conducted to the work here indicated as the surface 29. At the outer end of the conduit is a nozzle structure 30 into which the material is fed and where it is acted upon by fluid under pressure delivered through a pipe 31, as controlled by a valve 32 and projected from a nozzle 33 within the nozzle structure 30 and in substantially longitudinal alignment with the outlet opening 34 of the nozzle.

In order to agitate and mechanically feed the plastic material from the restricted end of the pressure chamber 15 through the sealing chamber 23 and the auxiliary mixing chamber 24, a scraping blade 35 is mounted on an extension 36 of the shaft 17 and forms a section of a helix extending around the shaft and moving along the inner face of the wall of the sealing chamber 23. A plurality of inclined mixing paddles 37 are mounted upon the shaft 36 within the auxiliary mixing chamber 24 and tend to agitate the plastic material and mix it with the material delivered through the pipe 25.

In operation of the present invention various ingredients to form a suitable plastic mass are introduced into the mixing structure 13 and are there agitated and thoroughly commingled, after which they may be discharged from the mixing structure by drawing the door 38 to one side by the operating rod 39 and permitting the mixed material to fall into the hopper 14. As the material falls into this hopper it will be engaged by the conveyor screw 16 and will be advanced along the pressure chamber 15. During this advance the diameter of the pressure chamber will progressively decrease and the material will be compacted and moved forward with progressive force. It will then be forced through the sealing chamber 23 in a substantially solid cylindrical mass agitated only by the scraper 35 which prevents it from sticking in the sealing chamber and clinging to the walls. This material will then be forced into the relatively large mixing chamber 24 where a predetermined quantity of liquid such as water will be continuously added and mixed into the mass by the mixing paddles 37. This added liquid will tend to lubricate the mass and desirably thin it, so that it will be forced through the conduit 28 in a state substantially that desired for applying to the surface 29. When the material reaches the cavity 40 within the nozzle structure 30 it will be acted upon by the jet of fluid under pressure projected from the pressure nozzle 33 and as it strikes the wall 41 of the nozzle housing will be disintegrated and forced outwardly through the opening 34 in a jet of desired fineness with a regular velocity, so that it will be caused to impinge against the surface 29 and to accumulate thereon to any desired degree of thickness. Attention is also directed to the fact that the action of the nozzle 33 will tend to create suction within the conduit 28 and draw the material forwardly as it is initially urged by the screw 16.

It will thus be seen that the structure here shown provides a simple means for conveying plastic material, making it possible to use the device in plastering buildings, filling concrete forms, and otherwise conveying plastic material to surfaces of receptacles designed for its reception, the structure being quite simple in operation and not liable to get out of order during long periods of continuous use.

While we have shown the preferred form of our invention, as now known to us it will be understood that various changes may be made in combination, construction, and arrangement of parts by those skilled in the art without departing from the spirit of our invention as claimed.

Having thus described our invention, what we claim and desire to secure by Letters Patent is:

1. A device of the character described, for mixing and conveying cementitious materials, which includes a conical housing, a screw conveyor extending longitudinally within said housing and being progressively reduced in diameter near the small end of said housing, a mixing chamber in direct connection therewith and of a diameter greater than that of the small end of the housing, mechanical mixing means therein, a liquid supply pipe connecting therewith, a conduit of substantially the same diameter as that of the small end of the housing and which conduit connects with the opposite end of said mixing chamber, from the housing, an outlet nozzle on the opposite end of the conduit and having a discharge opening of lesser diameter than the conduit, and means for introducing a supply of air under pressure into said nozzle to aid in disintegrating and projecting the material therefrom.

2. A device of the character described for mixing and conveying cementitious material, which includes a horizontally disposed conical housing, a hopper at the large end thereof for introducing cementitious material thereinto, a conveyor screw extending longitudinally of said housing and reducing in diameter corresponding with that of the housing, a cylindrical outlet throat at the reduced end of said housing, an enlarged cylindrical mixing chamber in longitudinal alignment and in communication with said outlet throat, a shaft forming an extension of the shaft of the screw conveyor and extending longitudinally of the mixing chamber, mixing paddles on said shaft, means for introducing water into the mixing chamber to mix with the cementitious material therein, an outlet member on the end of said mixing chamber having a cross-section of lesser diameter than that of the mixing chamber and the inlet opening thereto, a conduit communicating with said outlet member and through which the cementitious material is forced by the action of said conveying screw and a nozzle at the outer end of said conduit having a discharge opening of relatively small diameter and being provided with means to introduce air into the nozzle to assist the screw conveyor in projecting the material therefrom.

GUSTAVE EDWARD WESTBERG.
LAWRENCE E. McCORMACK.